Oct. 12, 1937.  R. C. JACOBS  2,095,442
ADJUSTABLE VEHICLE SEAT
Filed Nov. 29, 1935  2 Sheets-Sheet 1

INVENTOR
Rex C. Jacobs
BY
ATTORNEYS

Oct. 12, 1937.　　　R. C. JACOBS　　　2,095,442
ADJUSTABLE VEHICLE SEAT
Filed Nov. 29, 1935　　2 Sheets—Sheet 2

INVENTOR
Rex C. Jacobs

BY

ATTORNEYS

Patented Oct. 12, 1937

2,095,442

UNITED STATES PATENT OFFICE 2,095,442

ADJUSTABLE VEHICLE SEAT

Rex C. Jacobs, Detroit, Mich.

Application November 29, 1935, Serial No. 52,217

5 Claims. (Cl. 155—14)

This invention relates to automobile seats, and more particularly to means for supporting the seats occupied by the operators of the vehicles whereby such seats may be adjusted to suit different operators.

The primary object of the invention is to provide for two distinct modes of adjustment of an automobile seat, one being to position the seat either nearer to or farther remote from the steering wheel and controls of the vehicle and the other being to change the angularity of the seat and its back rest so that the seat supports the vehicle operator in a comfortable driving position. More specifically stated, the invention provides for adjustment movement of the seat either toward or away from the steering wheel and controls and as a result of such movement provides for a change in the angular position of the seat and back rest so that when the seat is moved forward or nearer to the steering wheel and controls the rear edge of the seat is elevated and the back rest is tilted into a more erect position.

Another object of the invention is to provide a slide and seat tilting assembly wherein the fulcrum of the seat tilting movement is located rearwardly of the forward edge so that the said forward edge is lowered when the seat is moved forward and is elevated when the seat is moved rearwardly. The seat thus accommodates all different drivers by supporting them in a comfortable driving position regardless of their particular leg length.

Still another object of the invention is to provide an inexpensive seat slide and tilting assembly and to accomplish this object the parts of the assembly are designed whereby they may be formed as stampings.

Figure 1:
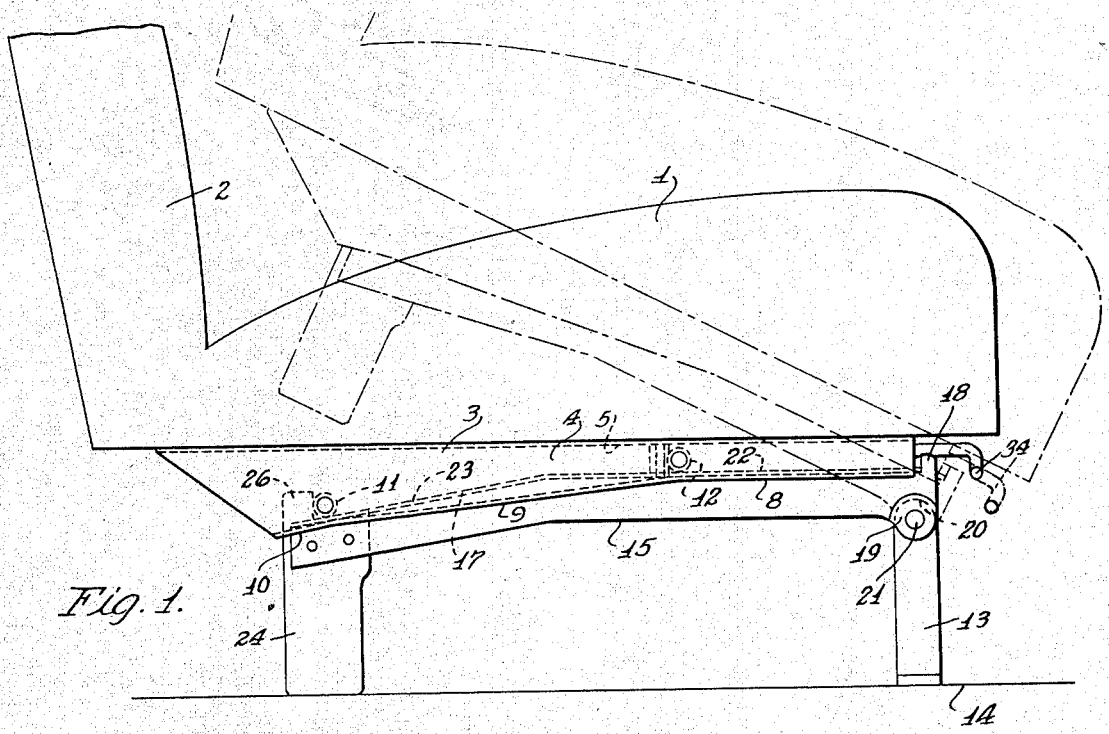
Figure 2:
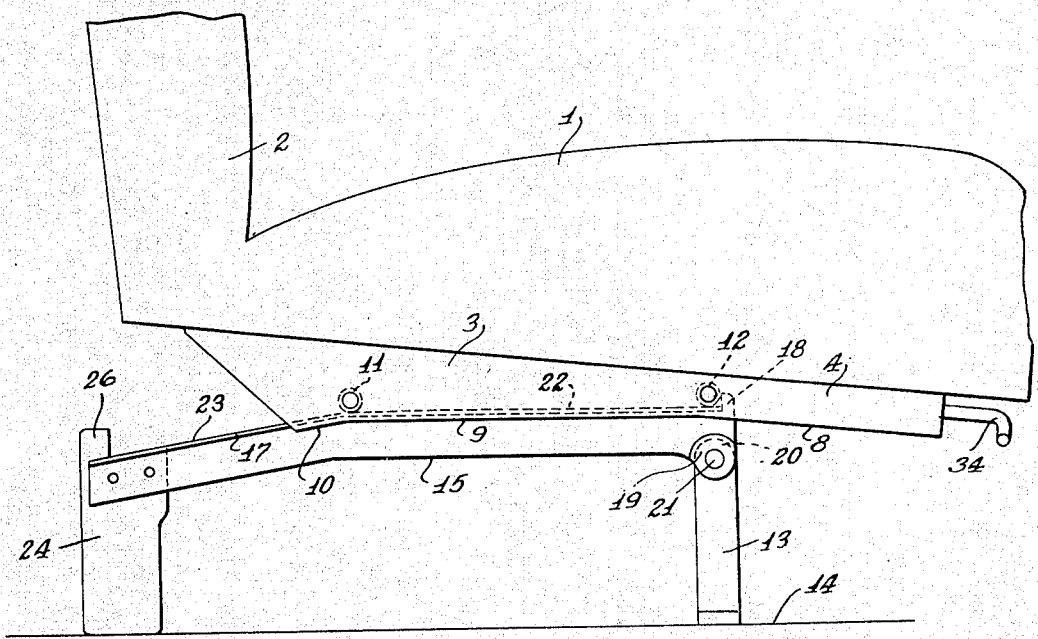
Figure 3:
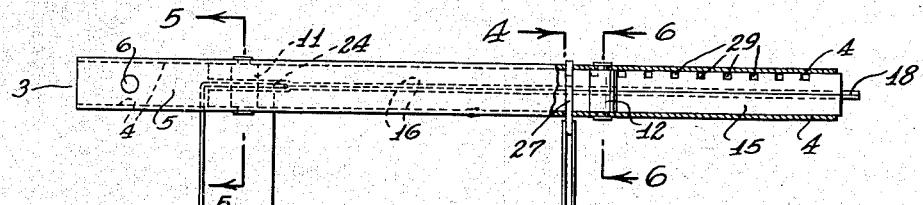
Figure 4:
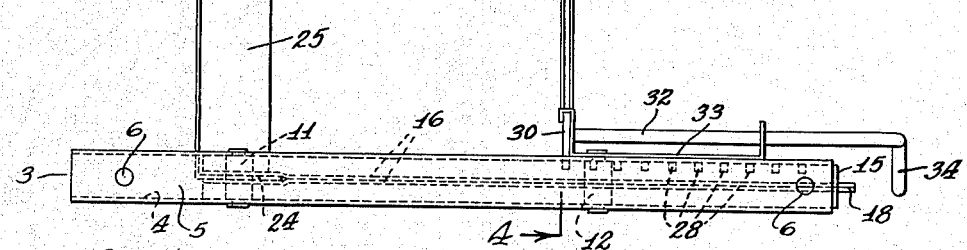
Figure 4:
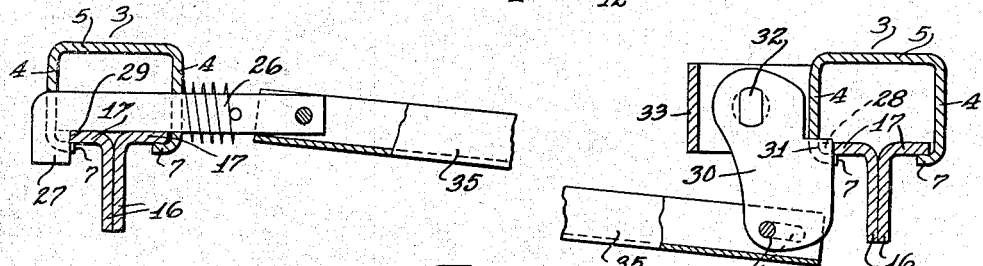
Figure 5:
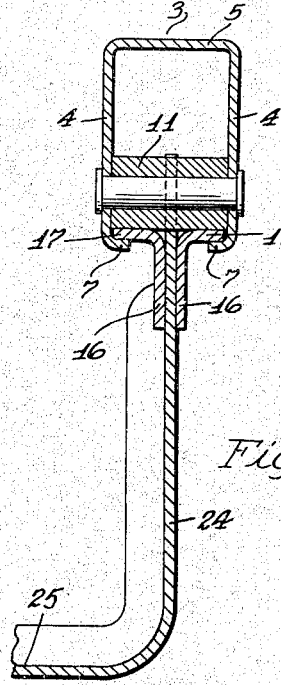
Figure 6:
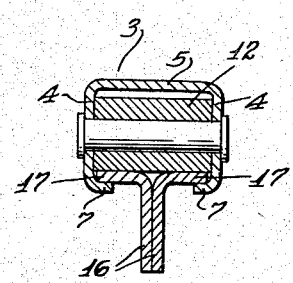
Figure 7:
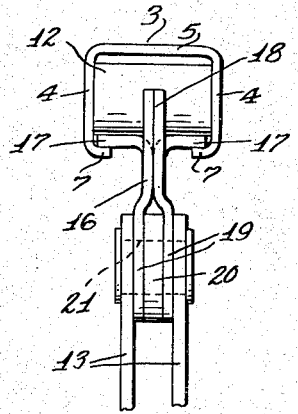

With the above and other ends in view the invention consists in matters hereinafter more particularly pointed out with reference to the accompanying drawings, in which Figs. 1 and 2 are side elevations, illustrating different positions of adjustment;

Fig. 3 is a plan of the slide assembly with the seat removed, a part of the assembly being broken away and in cross section;

Figs. 4, 5 and 6 are sections taken respectively on the lines 4—4, 5—5 and 6—6 of Fig. 3, and Fig. 7 is an end view of a part of the assembly.

Like characters of references are employed throughout to designate corresponding parts.

In the drawings the numeral 1 designates an automobile seat having a back rest 2. Attached to the bottom of the seat are two slides 3, formed of sheet metal, and being of channel shape. More specifically, the slides 3 when viewed in cross section comprise two parallel side walls 4 united by an integral web portion 5, the web portion having apertures 6 for the reception of bolts (not shown) for attaching the slides to the bottom of the seat. The edges of the side walls are bent inwardly to provide flanges 7 and upon reference to Figures 1 and 2 it will be noted that the portion of the flanges designated 8 extends substantially parallel to the web 5, that the portion designated 9 inclines downwardly at an angle to the portion 8, and that the portion 10 inclines downwardly at an angle to the portion 9. The ends of the slides 3 are open and supported within the slides are rollers 11 and 12. The rollers 11 are located adjacent to the rear ends of their respective slides and the rollers 12 are located at points spaced inwardly from the forward ends of the slides.

Pivotally attached to brackets 13 which are rigidly secured to the floor 14 of the vehicle are guide members 15. The guide members are formed of two stamped parts 16 which are welded together, each of the parts 16 having an outwardly extending flange 17. The flanges 17 terminate at a point spaced from the forward ends of the parts 16 whereby to provide a surplus of metal which extends upwardly to provide stops or abutments 18, and the parts 16 have depending ears 19 reinforced by inserts 20 for the reception of pins 21 which secure the parts 16 to the brackets 13. The upper surfaces of the flanges 17 are formed with substantially horizontal portions 22 extending rearwardly from the forward ends thereof and with downwardly inclined portions 23 extending from the portions 22 to the rear ends thereof. The rear ends of the parts 16 are spaced apart for the reception of brackets 24 and the two brackets 24 are united by a rigid web 25. Each bracket 24 has an integral upwardly extending portion 26 providing a stop or abutment.

When the parts of the above described mechanism are assembled the flanges 17 are interposed between the rollers 11 and 12 and the flanges 7 on respective slides 3, thus securing the slides on their respective guides. As shown in broken lines in Fig. 1, the guides 15 may be swung around their pivots 21. This function is necessary in order to adapt the seat for use in vehicles having only two doors, to permit the seat to be swung out of the way of back seat passengers.

A locking means is provided for holding the slides 3 against sliding movement relative to the guides 15. This locking means is shown more particularly in Fig. 4 and comprises a bolt 26 slidably mounted in one of the slides 3 and having a locking portion 27 adapted to project into one of a plurality of notches 28 in a flange 17 of one of the guides, shown in Fig. 3. A flange 17 on the other guide 15 has a correspondingly spaced series of notches 29 (see Fig. 3) and a latch element 30 has a portion 31 adapted to project into these notches. The latch element 30 is secured on the end of a rod 32 which is rotatably supported by a bracket 33, the rod having a handle portion 34 by means of which it may be manually moved. A link 35 is connected at one end to the bolt 26 and at its other end to the latch 30 by a slot and pin connection designated at 36.

When the bolt 26 and the latch 30 are in engagement with one of their respective series of notches 28 and 29 the slides 3 are held against movement relative to the guides 15 and when the rod 32 is moved rotatively by manual pressure they are withdrawn from their respective notches so as to leave the slides free to move on their guides, at which time the seat 1 may be moved forward or rearward. With the parts in the position shown in Fig. 1, which is the extreme rearward position, further movement is prevented by the abutment 26, and with the parts in the position shown in Fig. 2, which is the extreme forward position, further movement is prevented by engagement of the rollers 12 with the abutments 18. During movement from the position shown in Fig. 1 to that shown in Fig. 2 the rollers 11 ride up the incline 23 whereas the rollers 12 traverse the substantially horizontal path 22, resulting in an action wherein the seat fulcrums around the rollers 12. This action tends to change the plane of the seat and to throw the back rest 2 forward into a more erect position. The angular portions 8, 9 and 10 of the flanges 7 remain in close proximity to or in light contact with the under surfaces of the flanges 17 during this movement as may be seen upon reference to Figs. 1 and 2. During movement from the position shown in Fig. 1 the reverse action takes place, that is to say, the seat 1 fulcrums around the rollers 12 so that the rear edge is lowered and the forward edge is elevated, while the back rest 2 is moved away from an erect position.

Although a specific embodiment of the invention has been illustrated and described it will be understood that various changes may be made within the scope of the appended claims without departing from the spirit of the invention, and such changes are contemplated.

What I claim is:

1. In combination, a pair of guides each having laterally projecting means at their upper edges providing bearing surfaces which extend throughout the length thereof, a pair of slides adapted for attachment to a vehicle seat and to be held thereby in parallel relation, rollers mounted in said slides and adapted to traverse said bearing surfaces, means on said slides cooperating with said laterally projecting means for maintaining said rollers in rolling contact with said bearing surfaces, brackets at the fore and aft ends of said guides and adapted to be supported by a vehicle floor, said brackets being attached to respective ends of said guides to support them spaced with respect to the floor, and an integral element on each aft bracket projecting above the bearing surfaces on said guides and into the path of movement of said rollers whereby engagement of the rollers therewith restricts movement of the slides with respect to said guides.

2. In combination, a pair of guides each having laterally projecting means at their upper edges providing bearing surfaces which extend throughout the length thereof, a pair of slides adapted for attachment to a vehicle seat and to be held thereby in parallel relation, rollers mounted in said slides and adapted to traverse said bearing surfaces, means on said slides cooperating with said laterally projecting means for maintaining said rollers in rolling contact with said bearing surfaces, brackets at the fore and aft ends of said guides and adapted to be supported by a vehicle floor, said brackets being attached to respective ends of said guides to support them spaced with respect to the floor, an integral element on each aft bracket projecting above the bearing surfaces on said guides and into the path of movement of said rollers whereby engagement of the rollers therewith restricts movement of the slides with respect to said guides, said fore brackets being pivotally connected to their respective guide ends, and a rigid transverse member uniting said after brackets.

3. In combination, a pair of guides, each guide being comprised of a pair of angle pieces secured together in inverted opposed relation whereby angular parts of each piece forms a complemental part of a bearing surface, said angle pieces having portions adjacent their ends spaced apart for the reception of brackets, brackets received between said spaced portions and attached to said angle pieces, the bracket at one end of each guide having an integral portion projecting above said angle pieces, and slides received on said bearing surface and adapted to be restricted as to movement thereon by said projecting portions.

4. In combination, a pair of guides, each guide being comprised of a pair of angle pieces secured together in inverted opposed relation whereby angular parts of each piece forms a complemental part of a bearing surface, said angle pieces having portions adjacent their ends spaced apart for the reception of brackets, brackets received between said spaced portions and attached to said angle pieces, the brackets at one end of each guide having an integral portion projecting above said angle pieces, the brackets at the other ends of said guides being pivotally attached to said angle pieces, and slides received on said bearing surface and adapted to be restricted as to movement thereon by said projecting portions.

5. In combination, a pair of guides, each guide being comprised of a pair of angle pieces secured together in inverted opposed relation whereby angular parts of each piece forms a complemental part of a bearing surface, said angle pieces having portions adjacent their ends spaced apart for the reception of brackets, brackets received between said spaced portions and attached to said angle pieces, the bracket at one end of each guide having an integral portion projecting above said angle pieces, slides received on said bearing surface and adapted to be restricted as to movement thereon by said projection portions, and a rigid transverse member uniting the brackets having the projecting portions.

REX C. JACOBS.